United States Patent Office 2,773,110
Patented Dec. 4, 1956

2,773,110

PURIFICATION OF PARAFFIN HYDROCARBONS BOILING ABOVE ABOUT 380° C.

Robert Lüben, Oberhausen, Germany, assignor to Ruhrchemie Aktiengesellschaft, Oberhausen-Holten, Germany, a corporation of Germany No Drawing. Application June 11, 1952,
Serial No. 292,977

Claims priority, application Germany June 19, 1951

5 Claims. (Cl. 260—676)

This invention relates to improvements in the color purification of hydrocarbons. It more particularly relates to a process for the purification and preferably for the lightening of the color of totally or partially saturated hydrocarbons by hydrogenation of their hydrogenizable accompanying substances.

Hydrocarbons which are colorless and stable are, of course, extremely valuable for many purposes. In the production of hydrocarbons, in order to prepare these colorless and stable products, it is necessary to remove certain disturbing accompanying substances, such as, for example, oxygen-, nitrogen-, sulfur- or metal-containing compounds, corrosive or coloring constituents, high molecular weight impurities and the like. These accompanying substances are generally removed from paraffins or lubricating oils by a refining hydrogenation. Prior to the instant invention, very severe hydrogenation conditions were required in order to obtain the color purification and stability desired. In many cases, normal hydrogenation could not effect the purification and stability desired.

One object of this invention is the purification of totally or partially saturated hydrocarbons by hydrogenation without the above-mentioned difficulties. This and still further objects will become apparent from the following description:

It has now been found that the purification, and preferably the lightening of the color of totally or partially saturated hydrocarbons may be effected by hydrogenation if the hydrogenation is effected in the presence of solvents or diluting agents which have a vapor pressure of at most 1 atmosphere absolute at the lowest temperature encountered of approximately 100° C. and have a marked difference in boiling point as compared with the hydrocarbons being purified.

The hydrogenation in accordance with the invention is effected at temperatures between 100 and 300° C. and pressures between about 20 and 30 atmospheres gauge pressure. The process is also operable at hydrogen pressures above 30 atmospheres as, for example, at 100–200 atmospheres. However, it is the particular advantage of the working method in accordance with the invention that the effect desired may be obtained already at lower hydrogen pressures. The hydrogen pressures set forth in the specification are always given as hydrogen partial pressures. The quantity of hydrogen to be used is dependent on the quantity of unsaturated and oxygen-containing compounds present in the starting material. The hydrogenation is effected in the liquid phase.

The diluting agents or solvents used in accordance with the invention must have a vapor pressure of at most 1 atmosphere absolute at the lowest hydrogenation temperature encountered of approximately 100° C. The solvents or diluting agents must have a boiling point which differs from the boiling point of the hydrocarbon being treated by at least 50° C. and preferably by at least 70° C. The diluting agents or solvents may be present in amounts of 0.1 to 10 parts by weight for each part by weight of feed stock, and should preferably be present in 0.5–4 parts per part by weight of feed stock. The mixing proportion of the feed stock and the admixed materials is dependent on the refinability of the paraffin. Easily refinable paraffins, i. e. paraffins having little impurities, require approximately 0.5 part by weight of diluting agent per part by weight of feed stock, while equal parts by weight of diluting agent and feed stock are required when processing starting materials of medium refinability. For difficulty refinable feed stocks, four times the quantity of diluting agent must be used. After the hydrogenation, the solvent or diluting agent may be separated from the paraffin in any known manner, as by distillation or filtration or extraction.

Saturated and unsaturated hydrocarbons boiling up to approximtaely 320° C. may be used as the diluting agents or solvents in accordance with the invention. Aliphatic hydrocarbons having 7 and more carbon atoms, and preferably 9 carbon atoms, have proven particularly valuable for this purpose.

Any of the known catalysts which will transfer hydrogen may be used in accordance with the invention. For example, catalysts of the composition 100 Ni, 10 MgO, 50 kieselguhr, or 100 Cu, 20 MgO, 200 kieselguhr, or Raney nickel have proven particularly good. Also copper-chromium oxide catalysts and molybdenum sulfide or tungsten sulfide catalysts were successfully used. The quantity of the catalysts should be approximately 10% by volume and at least 3% by volume based on the starting material. Of course, there exists no upper limit for the quantity of the catalysts used. Certain advantages are offered when using non-metallic sulfur-resisting catalysts. No substantial increase in hydrogen pressure or reaction temperatures are needed with these catalysts. The refining hydrogenation proceeds in the same smooth manner as when using metallic catalysts.

The nickel-magnesium-kieselguhr catalyst (methanization catalyst) has proven particularly valuable as the hydrogen-transferring catalyst in accordance with the invention. In all cases where metallic catalysts may be used, nickel catalysts should preferably be employed. In the refining hydrogenation of sulfurous products, it is advisable to use molybdenum sulfide and/or tungsten sulfide or mixtures thereof in various proportions as the hydrogen-transferring catalyst.

The working method in accordance with the invention is applicable to aliphatic hydrocarbons having 7–70 carbon atoms and molecular weights up to approximately 1000. Aliphatic hydrocarbons of this molecular size having both straight and branched chains may be used as the starting material. Saturated and unsaturated hydrocarbons may be present, also mixtures of both types in any conceivable mixing proportion are possible.

The practical execution of the hydrogenation in accordance with the invention, may be effected without difficulty in a continuous manner. When operating continuously, the product and solvent are jointly conducted through a hydrogenation column in counter-current or concurrent flow relation with hydrogen. The mixture flowing off from the column is then freed from suspended catalyst particles and passed into distillation columns where the solvent is separated by distillation from the hydrogenation products and recycled to the process. As mentioned, the saturated hydrocarbons of $C_7$ and higher are preferably used as diluting agents or solvents. The $C_9$ hydrocarbons which have a partial pressure of 8 atmospheres gauge at 250° C. and a boiling point of 150° C. are particularly well suited. They allow a clean and easy separation from the paraffin by distillation.

When the hydrocarbons which are to be refined by the hydrogenation in accordance with the invention are low boiling, it is advisable to use high boiling solvents or diluting agents such as high boiling hydrocarbons. These high boiling solvents or diluting agents must have the low vapor pressure required, and, due to their high boiling point, may be easily separated from the feed stock.

The method in accordance with the invention is equally well suited for the purification of paraffins and oils which may be easily hydrogenated by the prior known conventional methods. The manner of operation in accordance with the invention has the advantage over these prior known methods in that complete hydrogenation may be effected at much lower hydrogen pressures, as, for example, at hydrogen pressures of 5 atmospheres guage and less.

Particularly favorable results have been obtained when proceeding according to the invention in the processing of paraffins boiling above 380° C. obtained from the so-called Oxyl synthesis. (See U. S. patent application Ser. No. 215,010 filed on March 10, 1951, the inventor of which is Walter Rottig.) The Oxyl synthesis is a modified Fischer-Tropsch type synthesis with the formation of a high yield of oxygenous compounds such as alcohols. In accordance with the said co-pending application, the synthesis is effected with the use of a precipitated iron catalyst containing a free alkali oxide content calculated as $K_2O$ between about 5 to 12% and having a reduction value of at least 60%. A carbon monoxide hydrogen containing gas with at least 1.2 parts by volume of hydrogen for each part by volume of carbon monoxide is used at elevated temperatures and pressures and more than 60% oxygenous compounds are present in the synthesis product formed. These Oxyl paraffins, prior to the present invention, have been very difficult to refine, and have resisted the refining hydrogenation or the action of other refining methods, so that it was not possible to obtain a colorless product. When proceeding in accordance with the invention, however, the Oxyl paraffins may be very easily hydrogenated and converted into a colorless product.

The following examples are given to illustrate the invention and not to limit the same:

Example 1

A dark brown colored Fischer-Tropsch paraffin boiling above 460° C., which had been stored for a long period in the melted state, and, after having been treated for 8 hours in an autoclave with 10% of Ni-Mg catalyst at 250° C. and a hydrogen pressure of 150 atmospheres gauge, remained completely unchanged, was mixed with $C_9$ hydrocarbon in a proportion of 1:1 and hydrogenated at 250° C. and a hydrogen pressure of 30 atmospheres gauge with 5% of Ni-Mg catalyst. The product had become completely colorless.

Example 2

The same product as mentioned in Example 1 was mixed with $C_9$ hydrocarbon in the same proportion and treated at a hydrogen pressure of 10 atmospheres gauge, the other conditions being the same as mentioned in Example 1. A colorless product was obtained.

Example 3

A paraffin boiling above 380° C. obtained from Fischer-Tropsch synthesis over iron catalyst, which could normally be easily refined at pressures above 50 atmospheres gauge, was mixed with a $C_9$ hydrocarbon in a proportion of 2:1 and was totally hydrogenated with 3% of a Ni-Mg catalyst at 250° C. and a hydrogen pressure of 5 atmospheres gauge.

Example 4

A petroleum extract oil was mixed with $C_7$ hydrocarbons in a proportion of 1:3 and hydrogenated with 5% of nickel catalyst at 250° C. and a hydrogen pressure of 30 atmospheres gauge in an autoclave. After the hydrogenation, the mixture was filtered and the $C_7$ hydrocarbon was separated by distillation. The starting oil had the following characteristics:

| | |
|---|---|
| Color | Brown-green, dark. |
| Density at 20° C | 1.009. |
| Flash point, open dish | 251° C. |
| Viscosity at 50° C | 16.06° E. |
| Solidification point | +2° C. |
| Asphalt | 14.97%. |
| Sulfur | 1.12%. |
| Iodine number | 46. |
| Neutralization number | 0.7. |
| Saponification number | 2.9. |
| Refractive index $n_D^{20}$ | 1.5890. |

The hydrogenated oil had the following characteristics:

| | |
|---|---|
| Color | Amber-colored. |
| Density at 20° C | 0.900. |
| Flash point, open dish | 205° C. |
| Viscosity at 50° C | 11.86° E. |
| Solidification point | +26° C. |
| Conradson carbon test | 0.108%. |
| Iodine number | 40. |
| Neutralization number | 0. |
| Saponification number | 0. |
| Refractive index $n_D^{20}$ | 1.515/39.9. |
| Viscosity index | 43.5. |

Example 5

The same product as mentioned in Examples 1 and 2 was mixed with saturated $C_{15}$ hydrocarbons in equal portions and was hydrogenated for 2 hours in an autoclave at 250° C. and a hydrogen pressure of 30 atmospheres gauge in the presence of 10% of molybdenum sulfide. A colorless product was obtained.

Example 6

An Oxyl synthesis product boiling above 380° C. was mixed with a completely hydrogenated $C_9$ hydrocarbon in equal portions and hydrogenated in an autoclave at 250° C. and a hydrogen pressure of 30 atmospheres gauge in the presence of 5% of Ni-Mg catalyst. After separation of the diluting agent, an absolutely colorless product was obtained.

The diluting agents or solvents which are present during the hydrogenation in accordance with the invention, will be referred to as "accompanying liquids" in the claims.

I claim:

1. Process for the purification of paraffin hydrocarbons boiling above about 380° C. which comprises contacting such a hydrocarbon in the liquid phase with hydrogen at a temperature between about 100 and 300° C. at an elevated pressure not in excess of about 30 atmospheres gauge in the presence of a hydrogen-transferring catalyst and a saturated aliphatic hydrocarbon having 7 to 9 carbon atoms and a vapor pressure not in excess of about 1 atmosphere absolute at about 100° C. and recovering the purified hydrocarbon formed.

2. Process according to claim 1 in which said saturated aliphatic hydrocarbon is present in amount of about 0.5:4 parts for each part of the hydrocarbon being purified.

3. Process according to claim 1 in which said hydrogen-transferring catalyst is a nickel-containing catalyst.

4. Process according to claim 1 in which said hydrocarbon to be purified and said saturated aliphatic hydrocarbon are jointly substantially continuously passed in contact with hydrogen and thereafter the saturated aliphatic hydrocarbon is separated from the refined product and recycled.

5. Process according to claim 4 in which the saturated aliphatic hydrocarbon is separated from the refined product by distillation.

References Cited in the file of this patent

UNITED STATES PATENTS

| | | |
|---|---|---|
| 2,392,579 | Cole | Jan. 8, 1946 |
| 2,574,331 | Knox | Nov. 6, 1951 |
| 2,574,446 | Docksey et al. | Nov. 6, 1951 |
| 2,587,987 | Franklin | Mar. 4, 1952 |
| 2,673,175 | Stratford et al. | Mar. 23, 1954 |